United States Patent
Reddy

(10) Patent No.: US 10,366,362 B1
(45) Date of Patent: Jul. 30, 2019

(54) FEATURE BASED MODELING FOR FORECASTING AND OPTIMIZATION

(71) Applicant: Featuremetrics, LLC, Kinnelon, NJ (US)

(72) Inventor: Visveshwar Reddy, Kinnelon, NJ (US)

(73) Assignee: Featuremetrics, LLC, Kinnelon, NJ (US)

( * ) Notice: Subject to any disclaimer, the term of this patent is extended or adjusted under 35 U.S.C. 154(b) by 181 days.

(21) Appl. No.: 14/057,698

(22) Filed: Oct. 18, 2013

Related U.S. Application Data

(60) Provisional application No. 61/707,997, filed on Oct. 18, 2012.

(51) Int. Cl.
*G06Q 10/06* (2012.01)

(52) U.S. Cl.
CPC ..... *G06Q 10/067* (2013.01); *G06Q 10/06375* (2013.01)

(58) Field of Classification Search
CPC ............. G06Q 10/06375; G06Q 10/06; G06Q 10/0639; G06Q 10/04; G06Q 10/063
USPC ........................................................ 705/7.37
See application file for complete search history.

(56) References Cited

U.S. PATENT DOCUMENTS

| | | | |
|---|---|---|---|
| 2005/0096950 A1* | 5/2005 | Caplan et al. | 705/7 |
| 2009/0259534 A1* | 10/2009 | Utter et al. | 705/14 |
| 2010/0138285 A1* | 6/2010 | Leonard et al. | 705/14.5 |
| 2010/0153183 A1* | 6/2010 | Ulwick | G06Q 10/0631 705/7.12 |
| 2011/0004506 A1* | 1/2011 | May et al. | 705/10 |
| 2011/0055620 A1* | 3/2011 | Sengupta | G06F 17/30011 714/2 |

OTHER PUBLICATIONS

Pyzdek, Thomas. The Lean Six Sigma Handbook, N.Y., McGraw-Hill, 2003, p. 606-607.*

* cited by examiner

*Primary Examiner* — Stephanie Z Delich
(74) *Attorney, Agent, or Firm* — Amin, Turocy & Watson, LLP

(57) ABSTRACT

Computer implemented systems and methods are provided that generate or at least facilitate forecasting and strategy outcomes optimization solution based upon metric analysis of characteristics, and/or other controlled attributes (collectively feature metrics) for products and/or services. A model that represents the relationship between periodic outcome variable (Y) and causal variables ($X_1 \ldots X_n$) is formulated using one or more suitable algorithmic techniques or models (e.g., linear regression, time series regression, Bayesian or a combination).

18 Claims, 6 Drawing Sheets

FEATURE BASED MODELING FOR FORECASTING AND OPTIMIZATION

CROSS REFERENCE TO RELATED APPLICATION(S)

This patent application claims priority to U.S. Provisional Patent Application No. 60/707,997, filed on Oct. 18, 2012, and entitled METHOD AND SYSTEM FOR PROMOTION IMPACT ANALYSIS AND PRICING DECISION SUPPORT; the entirety of this provisional application is incorporated herein by reference.

TECHNICAL FIELD

The disclosed subject matter generally relates to system(s) and method(s) for analyzing, forecasting and optimizing outcomes based upon a metric analysis of characteristics, and/or other controlled attributes (collectively feature metrics) for products and/or services. The system can be used for decision support in areas including, but not limited to pricing and optimization, promotional effectiveness measurement, supply chain forecasting and demand management.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1A:
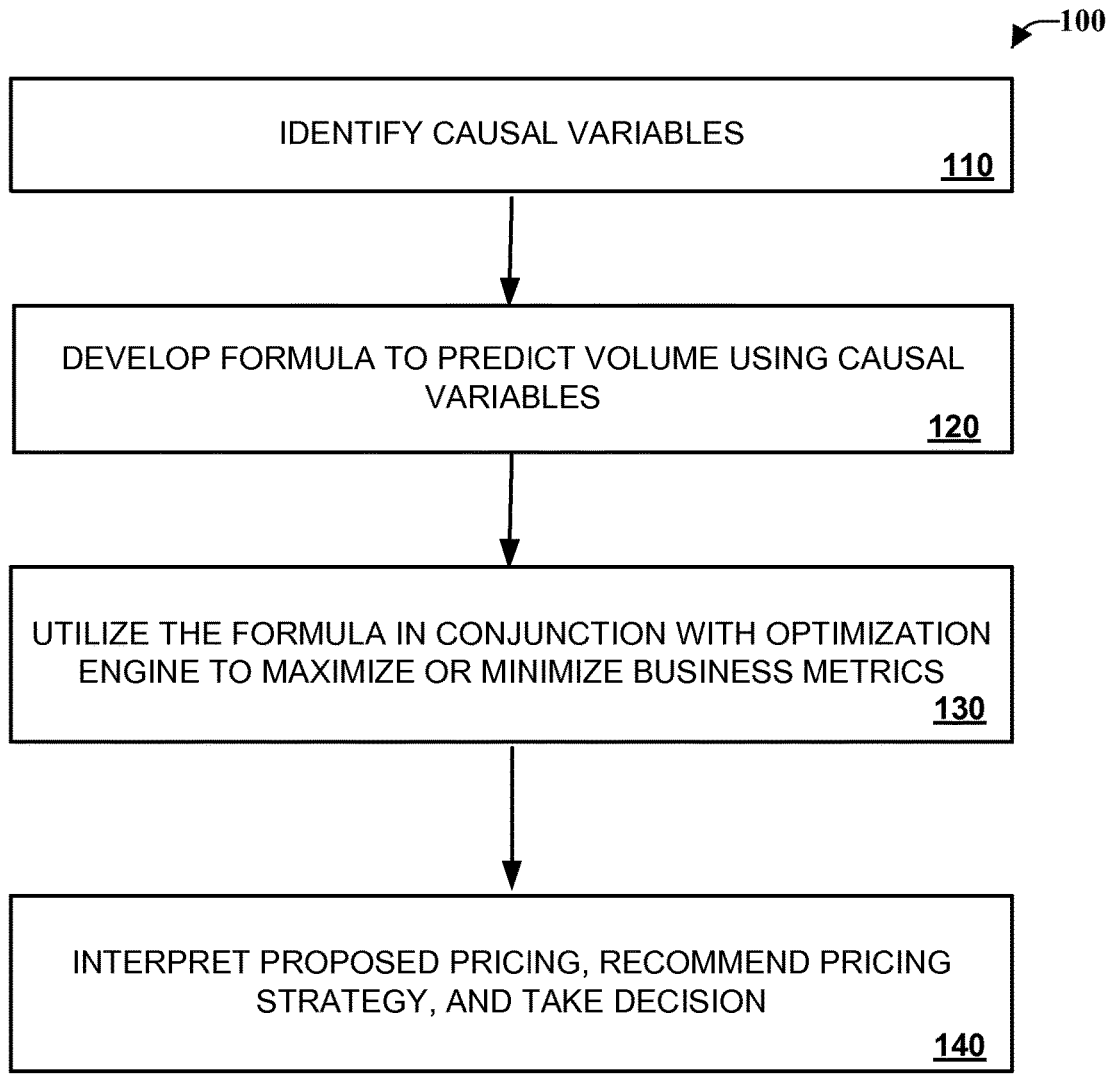
FIG. 1A illustrates a classical forecasting and optimization method in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

Aspects of the systems, apparatuses or processes explained in this disclosure can constitute machine-executable component(s) embodied within machine(s), e.g., embodied in one or more computer readable mediums (or media) associated with one or more machines. Such component, when executed by one or more machines, e.g., computer(s), computing device(s), virtual machine(s), etc. can cause the machine(s) to perform the operations described. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

Strategy determination, forecasting and optimization are central to many functional areas including but not limited to: pricing and optimization, revenue management, marketing effectiveness measurement and demand management.

Techniques employed to assist in strategy determination, forecasting and optimization range for example from qualitative judgmental methods to quantitative classical forecasting and optimization models where cause and effect is modeled taking into consideration different variables in historical data to develop a forecasting model and used in conjunction with an optimization engine to generate strategies. There are several challenges in the classical forecasting and optimization model starting with establishing cause and effect relationship of variables to interpreting the strategies recommend by the optimization engine.

The feature based modeling for forecasting and optimization provides a systematic approach for analysis, strategy determination and forecasting and optimizing outcomes based upon a metric analysis of characteristics, and/or other controlled attributes (collectively feature metrics) for products and/or services.

Figure 2:
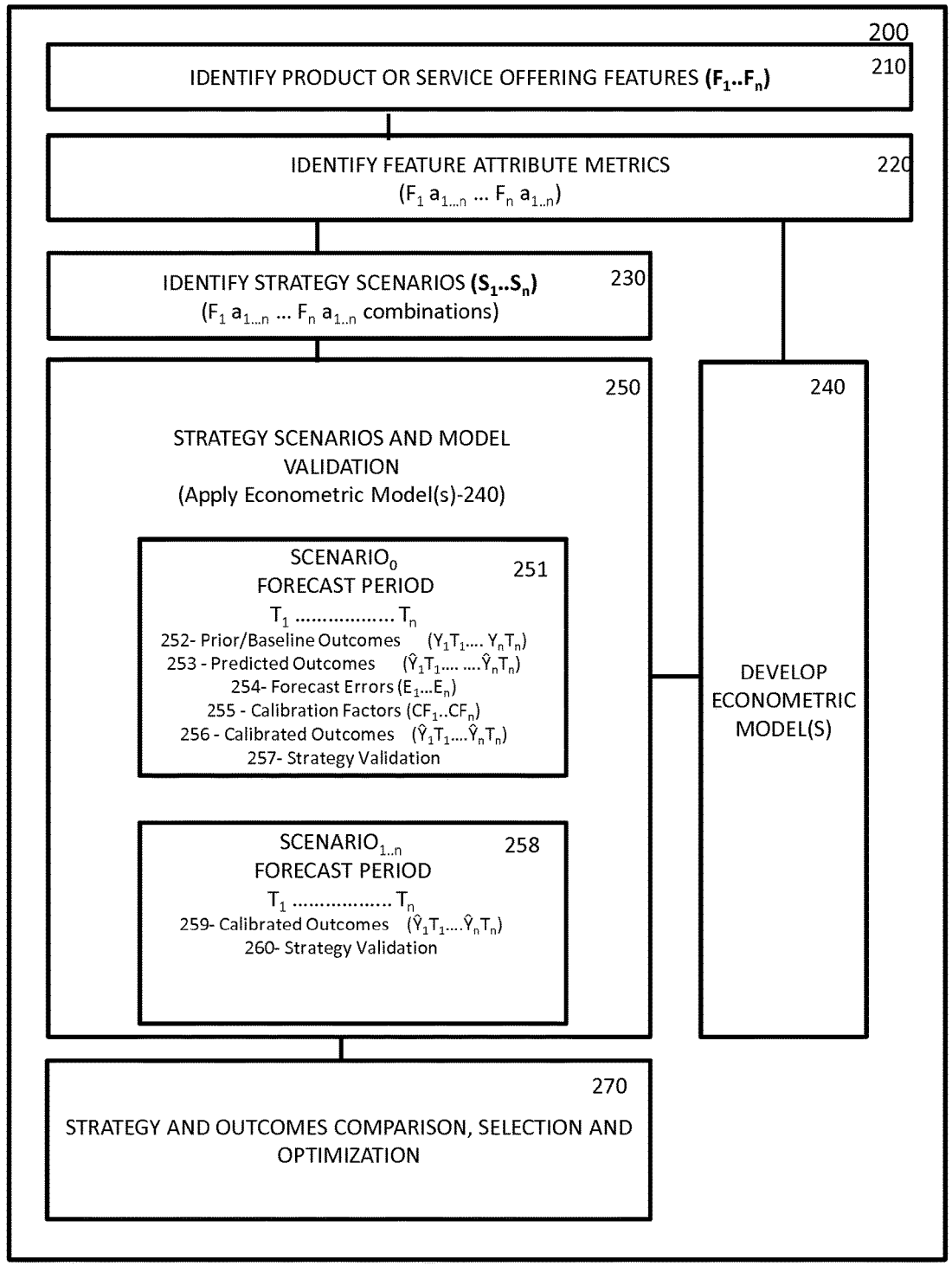
FIGS. 2-3 illustrate example flow diagrams of methods in accordance with various aspects and embodiments described herein.
Figure 3:
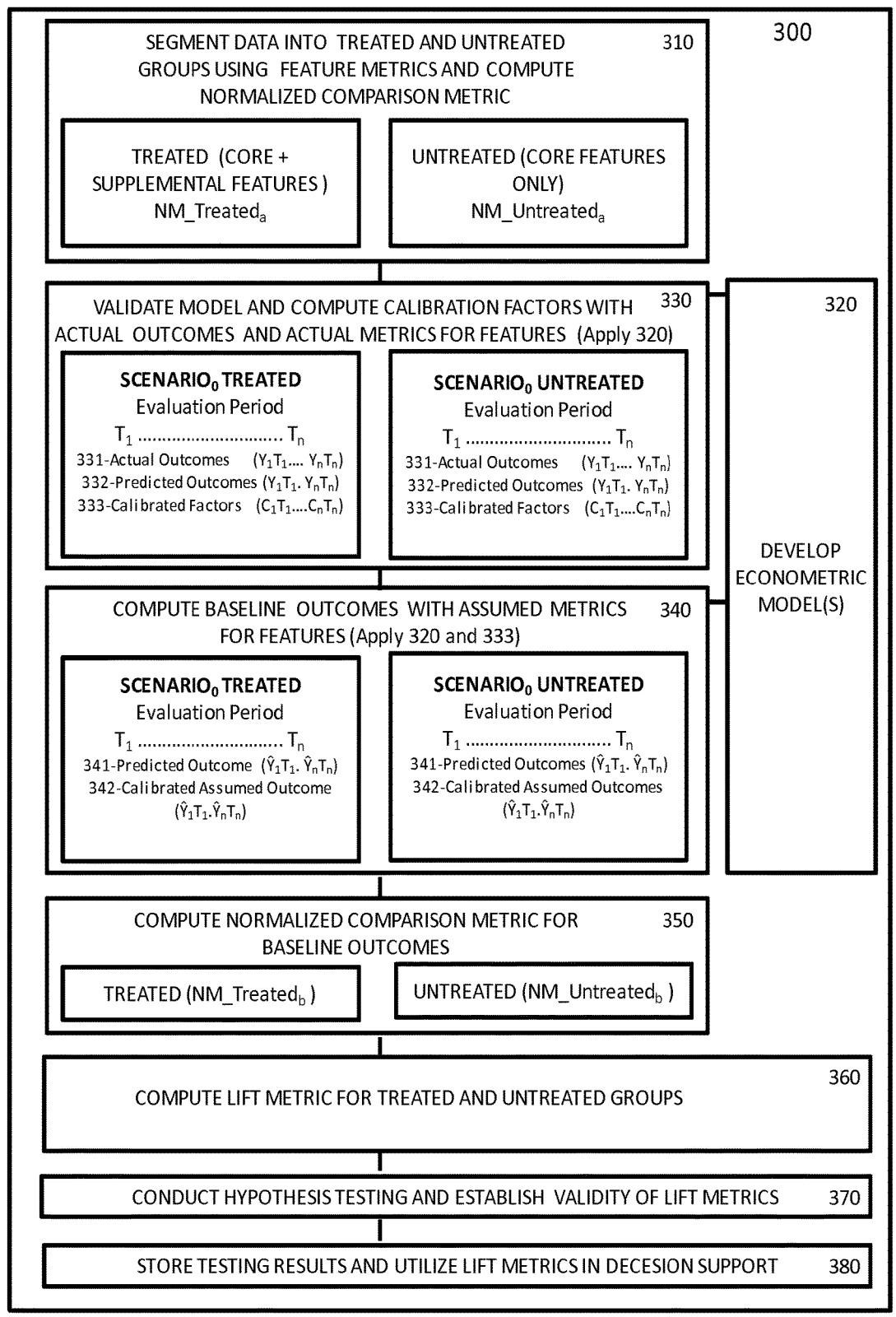

FIGS. 1A, 2 and 3 illustrate methodologies or flow diagrams in accordance with certain aspects of this disclosure. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

FIG. 1A illustrates a classical forecasting and optimization method 100. The process starts at 110, with an analysis of historical data and identification of causal variables (e.g., $X_1 \ldots X_n$) evaluated in relation to an identified periodic outcome (Y).

At 120, a causal model that represents the relationship between periodic outcome variable (Y) and causal variables ($X_1 \ldots X_n$) is formulated using one or more suitable algorithmic techniques or models (e.g., linear regression, time series regression, Bayesian or a combination). One non-limiting example of a causal model can be described as follows: Given a linear relationship between outcome Y (unit demand for a product or service offering) to causal variables ($X_1$=price of the product or service offering, $X_2$=advertising activities, $X_3$=price of a competitors products, $X_4$=category volume) and an associated model statistical error "e", one non-limiting example linear equation for demand can be expressed as:

$$Y = c_0 + c_1 X_1 + c_2 X_2 + c_3 X_3 \ldots + c_n X_n + e.$$

At 130, the causal model's statistical attributes and model performances are assessed/validated for a period such as for example an in-sample period or estimation period, hold-out or out-of-time assessment period and forecast period.

Application of the causal model with an optimization process such as Linear Programming, Mixed Integer Non Linear Programming or other suitable optimization algorithm(s) or techniques can yield recommendations based at least in part upon causal factors and constraints for forecast/predictive period(s) that maximize objectives (e.g., sales or profit targets), or attempt to minimize certain risks. In the absence of optimization, use of the causal model parameters often simply generate a periodic forecast/prediction of the periodic outcome $\hat{Y}$, as determined by the model's related causal inputs.

At 140, a decision maker(s) is presented with an interpretative assessment of the integration of causal factors to outcomes and recommendations presented by the model and optimization engine for decision making pertaining to the product and/or service.

There are several challenges in implementing causal factors in practice. For example, an interpretative assessment of decision making involving a pricing optimization solution based upon causal factors may face the following the challenges:

a) When a pricing plan is determined by an optimization engine, the identified predictive and/or correlated causal factor(s) may be independent of control or direct influence by the decision maker, lack a qualitative basis for support with management or stakeholders, fail to account for correlated effects of existing and/or projected strategies with regard to that product and/or service;

b) The pricing optimization solution generated by the model may be independent of the actual or feasible implementation resulting in validation and calibration challenges;

c) The resultant set of permutations and combinations of the causal variables may be impractical for purposes of interpretation, validation and implementation in relation to the model levels, number of channels, number of regions and other such variables;

d) The outcome ($\hat{Y}$) function may be generated by more than one statistical model. Combining more than one outcome ($\hat{Y}$) function and using an optimization method further complicates the outcome validation and calibration;

e) Causal variables such as advertising may not show as statistically significant when used in conjunction with a causal variable like price making it difficult to analyze the importance of marketing activities; or f) In many instances the portion of the data that can be held-out for assessment can be limited.

Figure 1B:
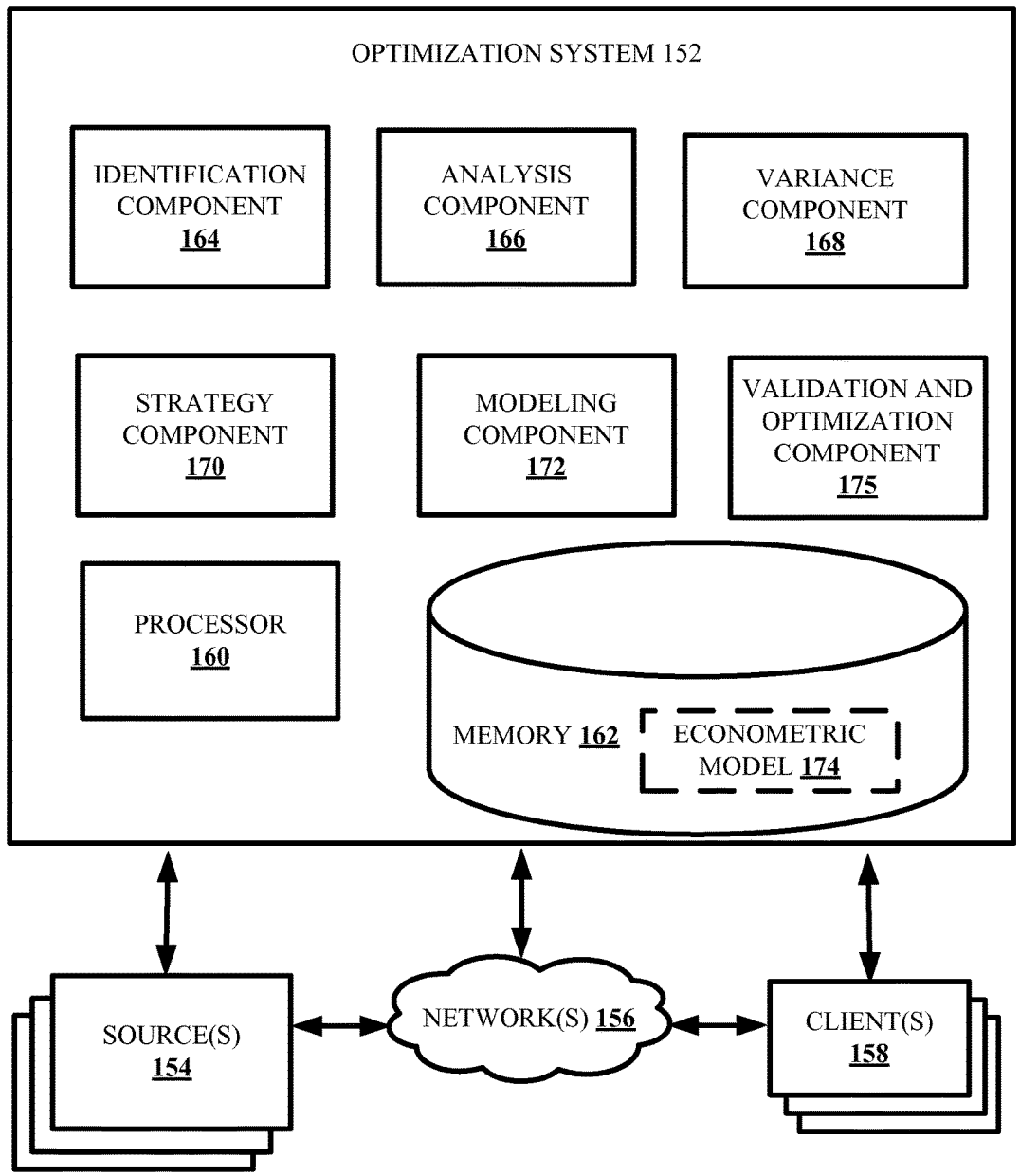
FIG. 1B illustrates an embodiment of a system that includes a forecasting optimization system that utilizes information from one or more sources regarding feature metric models in accordance with various aspects and embodiments described herein.

FIG. 1B illustrates an embodiment of a system 150 that includes an optimization system 152 that utilizes information from one or more sources 154 (e.g., in-house data bases, third-party data feeds . . . ) regarding feature metric models for products or services. One or more networks 156 (e.g., wireless, cellular, wide area network, local area network, fiber network, . . . ) can be utilized to share information across the sources, clients 158, and the system 152. The optimization system 152 generates or at least facilitates generating a strategy optimization solution based upon causal factors and outcomes. The system 152 includes a processor 160 and memory 162 that are employed to execute and store the following computer executable components: an identification component 164 identifies features of interest and assessment for a product or service; an analysis component 166 that determines or measures existence of feature attributes within known outcomes; a variance component 168 that determines variation of the feature attributes over a time horizon $(T_1+T_2+ \ldots +T_n)$, and generating a display of the variation of feature attributes; a strategy component 170 that generates and displays a set potential strategies ($S_1$ through $S_n$), wherein the strategies include assessment and qualification of efficacy of strategic outcomes; a modeling component 172 that uses derived feature related variables for the product or service strategies to generate an econometric model 174 with or without desired external causal variables; and a validation and optimization component 175 that performs analysis of the outcomes. Further details regarding acts or methods performed by the system and/or components is described below in connection with FIGS. 2-3.

FIG. 2 illustrates an embodiment of a metric analysis of features and strategies for products and services. Respective products or services have features including but not limited to functionality, price, service and marketing activities that impact outcome sought to be predicted and or assessed. Features of interest are identified from observational data, primary research and other sources such as product or service informational material. These features are identified in the modeling process in FIG. 2, as $F_1$ through $F_n$. At 210, the features of interest and assessment for the product or service are selected for modeling.

At 220, the existence of the feature attributes within: known outcomes are determined or measured; these feature attributes are identified and linked to each applicable feature. These feature attributes are identified as $F_1a_1$ through $F_na_n$. Metrics of the feature attributes in relation to outcomes are measured as discrete or continuous variables for representative periods $(T_1 \ldots T_n)$.

At 230, variation of feature attributes over a time horizon $(T_1+T_2+ \ldots +T_n)$ allows for a decision maker (e.g., a decision maker can be an individual, group of individuals, an entity, software in execution, hardware executing such software, or a combination thereof) to identify potential strategies to be employed for predictive modeling in relation to the identified features and attributes $(F_1a_1 \ldots F_na_n)$. These potential strategies are identified as $S_1$ through $S_n$. The strategies may also include assessment and qualification of efficacy of strategic outcomes. These potential strategies may include, among others, the following:

(a) Observational Strategies: feature attribute combinations, including but not limited to popular choice attributes and strategies with heightened efficacy;

(b) Business Rule Strategies: decision oriented strategies, including but not limited to business rules such as use of a prior year, benchmark standard or best practice strategy;

(c) Machine Learning Strategies: derived from supervised and un-supervised learning and/or system optimization of the metrics of features, outcomes and outcomes efficacies;

(d) Experimental Design Strategies: derived from combining feature metrics through the use of design of experiments; or (e) Combination Strategies: comprised of the combination(s) of one or more potential strategies.

The outcome(s) from the applicable strategy over the historical period is determined. Identification of the feature attributes, strategies, outcomes, and strategy efficacy provides enriched input variables for an econometric model to be created at 240. This method of strategy identification reserves as a Strategy Scenario 0, a "do nothing different" strategy which is based upon the application of historical feature metrics to calibrate and validate the econometric models which are applied.

At act 240, feature related variables for the product or service strategies derived from 230 are modeled into econometric models either with or without desired external causal variables (e.g., environmental or market influences which may influence the outcome but are otherwise separate from strategic decision making options). The econometric models for the product or service strategies may be designed to demonstrate either direct impact of selected variables on outcome for the product or service, or to provide outcomes based upon a proxy measure implementing one or more techniques such as for example: descriptive statistics, correlations, multivariate analysis, principle component analysis, and/or the like.

Mean Absolute Percentage Error (MAPE):

$$\sum_{t=1}^{n} \frac{100}{n} |Y_t - \hat{Y}_t| / Y_t$$

Mean Squared Error (MSE):

$$\sum_{t=1}^{n} (Y_t - \hat{Y}_t)^2 / n$$

Root Mean Squared Error (RMSE): $\sqrt{MSE}$

Accuracy, sensitivity, specificity, and derived measures (e.g., ROC curve, K–S) from an N×N confusion matrix (e.g., number of correct and incorrect predicted outcomes compared to actual outcomes) when the dependent variable is classified or classification constraints are applied.

TABLE 1

Illustration of a 2 × 2 confusion matrix, in the context of evaluating binary result outcomes that are either true or false.

| | | ACTUAL OUTCOME | | |
|---|---|---|---|---|
| | | TRUE | FALSE | |
| PREDICTION OUTCOME | TRUE | TRUE POSITIVE (TP) | FALSE POSITIVE (FP) | ACCURACY = (TP + TN)/ (TP + TN + FN + FP) |
| | FALSE | FALSE NEGATIVE (FN) SENSITIVITY = (TP/TP + FN) | TRUE NEGATIVE (TN) SPECIFICITY = (TN/FP + TN) | |

The econometric models can be designed for a "continuous variable" outcome with a determinate result (e.g., when the precise sales volume for a product is sought) or as a "discrete variable" with a categorical result (e.g., when the outcome sought should return a category, or a result such as a true or false condition). The Economic Model(s) should be created to account for the applicable predictive relationships (e.g., linear versus non-linear) between an outcome variable and applicable feature related variable(s) as well as any applied causal variables; statistical error characteristics (e.g., random versus autocorrelation of errors); standardization processes (e.g., trend, seasonality or the like); or one or more integrated stochastic predictive models (e.g., OLS, GLM, Time Series, Logistical Regression and MLE Bayesian).

The econometric models statistical attributes and model performances are evaluated in relation to periodic categories. In most instances, the modeling data will be categorized into one of three categories for purposes of evaluating the periodic influences. These three typical categories include: an in-sample or estimation period; a hold-out or out-of-time assessment period; or a forecast period.

When considering modeling data derived from an in-sample or estimation period, the outcome variable (Y), as well as related values for the feature and/or causal variables ($X_1 \ldots X_n$) are known. Using the known outcome and causal variables, the econometric models associated parameters ($C_0 \ldots C_n$), statistical attributes (e.g., $R^2$, Autocorrelation of Errors, Chi-Squared analysis, likelihood fit statistics and information criteria including AIC and BIC) and the predicted outcomes ($\hat{Y}$) are calculated.

For example, in an implementation, forecast error ($Y_t - \hat{Y}_t$) can be computed and analyzed using forecast error measures including:

Percentage Error (PE): $((Y_t - \hat{Y}_t)/Y_t)*100$

When considering modeling data derived from the hold-out or out-of-time assessment period, a portion of the known historical data is held-out for assessing model accuracy. The predicted outcomes $\hat{Y}$ and forecast error measures are derived from application of parameter estimates ($C_0 \ldots C_n$) (derived from the in-sample data) and feature and/or causal variables actual values ($X_1 \ldots X_n$) in the hold-out period. Analysis of the resulting forecast error measures provides insight into the model's predictive accuracy and limits, and model optimization and selection.

Data from in-sample and hold-out period can be combined to generate parameters estimates for the forecast period. In the forecast period, neither feature and/or causal variable values are known for ($X_1 \ldots X_n$) nor is the value of the outcome Y known. Values for $X_1 \ldots X_n$ that are input into the model for validation purposes can be user provided or derived from methods such as exponential smoothing or supplied by external sources that are related to the forecasted variables. The model parameter estimates ($C_0 \ldots C_n$) and causal variable input estimates ($X_1 \ldots X_n$) can be used to generate the model prediction of the outcome ($\hat{Y}$) for the forecast period.

In some instances, composite forecasts can be developed and implemented into the process of model assessment by combining forecasts from different models. The development of composite forecasts can be utilized to reduce risk of dependency on a single model, reducing forecast bias, and incorporate alternative strengths of different model methodologies. Composite forecasts can be a product of combined modeling techniques ranging from simple equal weighting of individual model forecasts to more advanced Bayesian techniques.

At 250, the econometric models are validated and calibrated for strategy scenarios. As discussed supra, in some instances a portion of data that can be held-out for assessment can be limited; there may have been mistakes in weighting the models correctly while combining the forecasts, the model may have been over-fitted and market testing of the models for the planning period may not have been appropriate. Additionally, the in-sample and out-of sample testing described in act 240 can provide insights into fit statistics and potential model performance unless the model(s) are tested in context of the strategy scenarios; the ability and accuracy of the model to scale to each strategy scenario cannot be ascertained without the validation in act 250.

Act 250 calls for validation of the econometric model(s) derived at act 240 with respect the strategy scenarios identified in act 230; and those outcomes are validated and calibrated utilizing the types of analysis and techniques described in act 230.

At 251, Strategy Scenario 0, ("$S_0$"),—"do nothing different" strategy is defined as the baseline strategy as it has existing actual values for the selected input metrics of the econometric models such as feature attribute causal variables, external causal variables, outcomes, and/or outcome efficacies, that have been obtained from a prior period that is similar to the forecast period that is to be modeled by the econometric models. The external causal variables are adjusted for any known or observed patterns including but not limited to trends, and/or seasonality, if appropriate.

At 252, the baseline outcomes are established from the historical period(s)

At 253, the Strategy Scenario 0 predicted outcomes and outcome efficacy results for the forecast period(s) are then generated by the econometric models for the forecast period(s). The resulting predicted outcome(s) for each period in the forecast period(s) is then compared with the outcome(s) for the analogous period of the previously identified known and existing outcome(s) the baseline outcome(s) as referenced above.

At 254, a comparison of the existing outcome(s) known for Strategy Scenario 0, to the econometric models predicted outcome(s) for Strategy Scenario 0 are then used to determine the econometric models predictive or forecast error for each period.

At 255, if an error bias exists in an econometric model, then an error calibration factor (such as 100+/−PE), and calibrated outcome(s) factor (such as predicted outcome*PE) is computed for each period of the forecast horizon. If there is no error bias, then the calibration factor and calibrated outcome(s) factor are null; and the econometric model outcome(s) are used as calibrated outcome(s) for balance of the method and process set forth below.

At 256, error calibration factors are then applied to the econometric model(s) Strategy Scenario 0 predicted outcome(s) and calibrated outcomes are calculated.

At 257, these error adjusted or calibrated predictive outcome(s) for Strategy Scenario 0 are then compared to the existing known outcome(s) for Strategy Scenario 0 identified above, for validation of the econometric models.

At 258, the econometric model(s) are applied to the Strategy Scenarios 1 thru n (Strategy Scenario$_{1 \ldots n}$) which were identified in act 230. Then at 259 predicted outcomes from the econometric models are then calibrated, (using the calibration factor from act 255), to yield calibrated predictive outcomes for each Strategy Scenario over the forecast period(s).

At 260, the calibrated predictive outcome(s) for each Strategy Scenario is validated over the individual periods of the forecast horizon through standard validation techniques and/or any applicable comparison using the outcome(s) history established in acts 220 and 230.

At 270, the calibrated predictive outcome(s) derived in acts 256 and 259 are compared, selected and optimized. Within this act the Strategy Scenarios can be supplemented with additional attributes, such as a Star Rating to further support the intended decision making process. Similarly at this stage new strategy scenarios may be developed and/or combined using the calibrated predictive outcomes from acts 256 and 259, with the strategy development processes in act 230; which can then in turn lead to further assessment and analysis in acts 259.

An Applied Example of Feature Based Modeling and Optimization

An example of the an application of the process described above in and illustrated in FIG. 2, with regard to pricing of a product (e.g., a spirit beverage such as for example: scotch, whiskey, vodka, gin, or the like), which will be referred to as a "Spirits" is described herein. This example is merely illustrative and is not intended to limit the scope or application of feature metrics based modeling and optimization process as to any product and/or service, as generally described in this application.

Applying act 210, with regard to the Spirits results in the identification of a single feature—"price," for purposes of this example. Therefore, as modeled in 210, $F_1$ is representative of the Spirits Price Feature.

Applying act 220, two feature metric attributes are identified with regard to the Spirits Price Feature: 1—promotion pricing depth; and 2—promotion pricing frequency. Accordingly within 220, $F_{1a1}$ is the promotion pricing depth, which $F_{1a2}$ is the promotion frequency.

Act 230 involves the identification and development of the Strategy Scenarios. By reviewing existing data for three prior periods, which are shown in Table 2, different strategy scenarios can be created based upon the variations in an applied strategy of the Spirits Price Feature in relation to promotion metrics of promotion pricing depth, and promotion frequency. As explained above, Strategy Scenario 0, is designated as a "do nothing different" strategy based upon the prior actions taken in prior applicable period(s) with regard to the feature metrics being considered. In the Spirits example, Strategy Scenario 0 applies the Pricing Promotion Depth, and Pricing Promotion Frequency established in Year 3. In addition to Strategy Scenario 0, the example identifies a Promotion Frequency Strategy, a Promotion Pricing Strategy, a Combination Strategy, and an End-user Strategy, enumerated as Strategy Scenario 1 through Strategy Scenario 4, respectively. Example Strategy Scenario 1 predicts the impact of price promotion frequency (a smaller price reduction with a greater promotion frequency); Scenario 2 predicts the impact of promotion pricing depth (a larger price promotion with a smaller promotion frequency); Strategy Scenario 3 predicts the impact of a combination of changes to promotion pricing frequency and promotion pricing depth; and Scenario 4 predicts the impact of end-user free-form strategies undertaken with respect to changes to the feature metrics.

TABLE 2

Historical feature metrics and outcomes for spirits.

| | Forecast Horizon (Pricing Calendar) | | | | Price Feature Attributes | | Outcome | Outcome Efficacy Against Benchmark | | |
| --- | --- | --- | --- | --- | --- | --- | --- | --- | --- | --- |
| Historical Period | Time Period-Q1 | Time Period-Q2 | Time Period-Q3 | Time Period-Q4 | Promotion Frequency | Promotion Depth | | Actual Market Share | Target Market Share | Efficacy |
| Year 1 | $25.95 27500 | $26.95 29500 | $24.95 32000 | $25.95 32000 | 3 | S1 to S2 | 120000 | 20.00% | 21% | N |
| Year 2 | $25.95 28000 | $26.95 30500 | $25.95 28000 | $25.95 32000 | 3 | S1 | 118500 | 18.29% | 28% | Y |
| Year 3 | $26.95 26000 | $25.95 33000 | $24.95 33500 | $24.95 34500 | 3 | S2 to S2 | 127000 | 18.49% | 18% | Y |

TABLE 3

Spirit Pricing Strategies.

| | | FORECAST HORIZON | | | | |
| --- | --- | --- | --- | --- | --- | --- |
| STRATEGY SCENARIO | VARIABLE | Q1 | Q2 | Q3 | Q4 | OUTCOMES |
| 230-Scenario 0: Do Donothing | Retail Price Prior Period | $26.95 | $25.95 | $24.95 | $24.95 | |
| | 252-Prior/Baseline Outcomes | 26,037 | 32,770 | 33,572 | 34,456 | 126,835 |
| | 253-Predicted Outcomes (PO) | 26,469 | 32,293 | 34,665 | 38,121 | 131,548 |
| | 254-Forecast Error | −2% | 1% | −3% | −11% | |
| | 255-Calibration Factor-CF | 98% | 101% | 97% | 89% | |
| | 256-Calibrated Outcomes (PO * CF) | 26,030 | 32,763 | 33,537 | 34,066 | 126,396 |
| | 257-Strategy Validation (255 compared 252) | | | | | |
| 230-Scenario 1: Promotion Frequency Strategy | Retail Price | $25.95 | $25.95 | $25.95 | $24.95 | |
| | 259-Calibrated Outcomes (PO * CF) | 26609 | 32086 | 32523 | 34066 | 125,284 |
| | 260-Strategy Validation (259 compared 252) | | | | | |
| 230-Scenario 2: Promotion Pricing Depth Strategy | Retail Price | $23.95 | $23.95 | $23.95 | $23.95 | |
| | 259-Calibrated Outcomes (PO * CF) | | | | | |
| | 260-Strategy Validation (259 compared 252) | 28341 | 34085 | 34512 | 35026 | 131,963 |
| 230-Scenario 3: Combination Strategy | Retail Price | $25.95 | $25.95 | $24.95 | $24.95 | |
| | 259-Calibrated Outcomes(PO * CF) | | | | | |
| | 260-Strategy Validation (259 compared 252) | 26,609 | 32,086 | 33,537 | 34,066 | 126,298 |
| 230-Scenario 4: End-User Free-Form Strategy | Retail Price | $26.95 | $25.95 | $25.95 | $24.95 | |
| | 259-Calibrated Outcomes (PO * CF) | | | | | |
| | 260-Strategy Validation (259 compared 252) | 26030 | 32763 | 32523 | 34066 | 125,383 |

Applying act 240, to the Spirits example an econometric model is developed such as: Log (Spirits Quantity)=$c_0$+$c_1$ Log (Spirits Price)+e.

The goodness of fit, forecast error and statistical validity of the selected econometric model is established for the in-sample period; and the model parameter estimates are developed. The parameter estimates are applied to the hold-out sample and the econometric model performance is assessed and the parameter estimates finalized for use in act 250.

At 252, Strategy Scenario 0 is developed utilizing the prior or historical pricing causal variables and demand volume for the length of the forecast period based upon the most recent data. While the period(s) may vary in actual application, in this example, the historical data for "Year 3" as shown in Table 2, is used for the Spirits price and volume data in act 252.

Then at 253, the econometric model developed in act 240, is applied to the Strategy Scenario 0 (the "do-nothing different strategy"), which operates to keep the feature metrics for the Spirits Pricing for the predictive period the same as in Year 3. In this example the Spirits Promotion Depth, ("$F_{1a1}$"), and Spirits Pricing Promotion Frequency ("$F_{1a2}$"), will be maintained consistent with Year 3, as the analogous predictive period. Inputting these feature metrics into the econometric model the predictive outcomes are computed and shown next to Strategy Scenario 0 in Table 3 (infra), therein at line 253.

Next at 254, the predictive forecast error and bias for the econometric model is derived based upon the Strategy Scenario 0 inputs and the resulting outcomes derived from the econometric model in act 253. In this Spirit's example shown in Table 3, the forecast error metric PE is normal for periods Q1 & Q2, while Q3 & Q4 evidence a positive bias for the econometric model. See, Strategy Scenario 0 in Table 3, at line 254.

At 255, the econometric model basis is corrected through the identification of the calibration factor which is in this example is based on (100+/−PE). See, Strategy Scenario 0 in Table 3, at line 255.

Within act 256 of the example, the econometric model outcome(s) are adjusted for predictive forecast error, by applying the calibration factor calculated from act 255 to the predicted outcomes for the relevant period(s), to derive the calibrated predictive outcome(s) for Strategy Scenario 0. See, Strategy Scenario 0 in Table 3, at line 256.

Next the calibrated predictive outcome(s) are validated at act 257. In this Spirit's example, validation is simply based upon a plain view reference of year over year. Since the strategy applied is consistent, the total actual volume for the prior period (126,835) and total calibrated volume (126,396) are in close approximation and the results appear to fit with an expected range.

At 258, the econometric model is applied to the remaining Strategy Scenarios 1 through 4. In the Spirit's example the predicted outcomes are computed for each Strategy Scenario, and the outcome(s) are calibrated using the Strategy Scenario 0 calibration factor(s); yielding calibrated predicted outcome(s) for each Strategy Scenario 1 through 4 (see Table 3 at lines numbered 259). As was the case in Strategy Scenario 0—these calibrated predictive outcome(s) for Strategy Scenarios 1 through 4 are also validated in a similar fashion or through the application of more sophisticated validation tools such as Bayesian analysis. See Table 3 at lines numbered 260.

Finally, in act 270 the calibrated predictive outcomes of all strategies (as depicted in FIG. 3 of the Spirits example) can be selected, refined, and optimized to obtain the Spirits feature metric's strategy which best fits the decision making objective in the context of the this example's analysis of product's strategies involving promotion pricing depth, and/or the product's promotional pricing frequency.

Embodiment 2—Determining the Impacts of Supplemental Features

Figure 4:
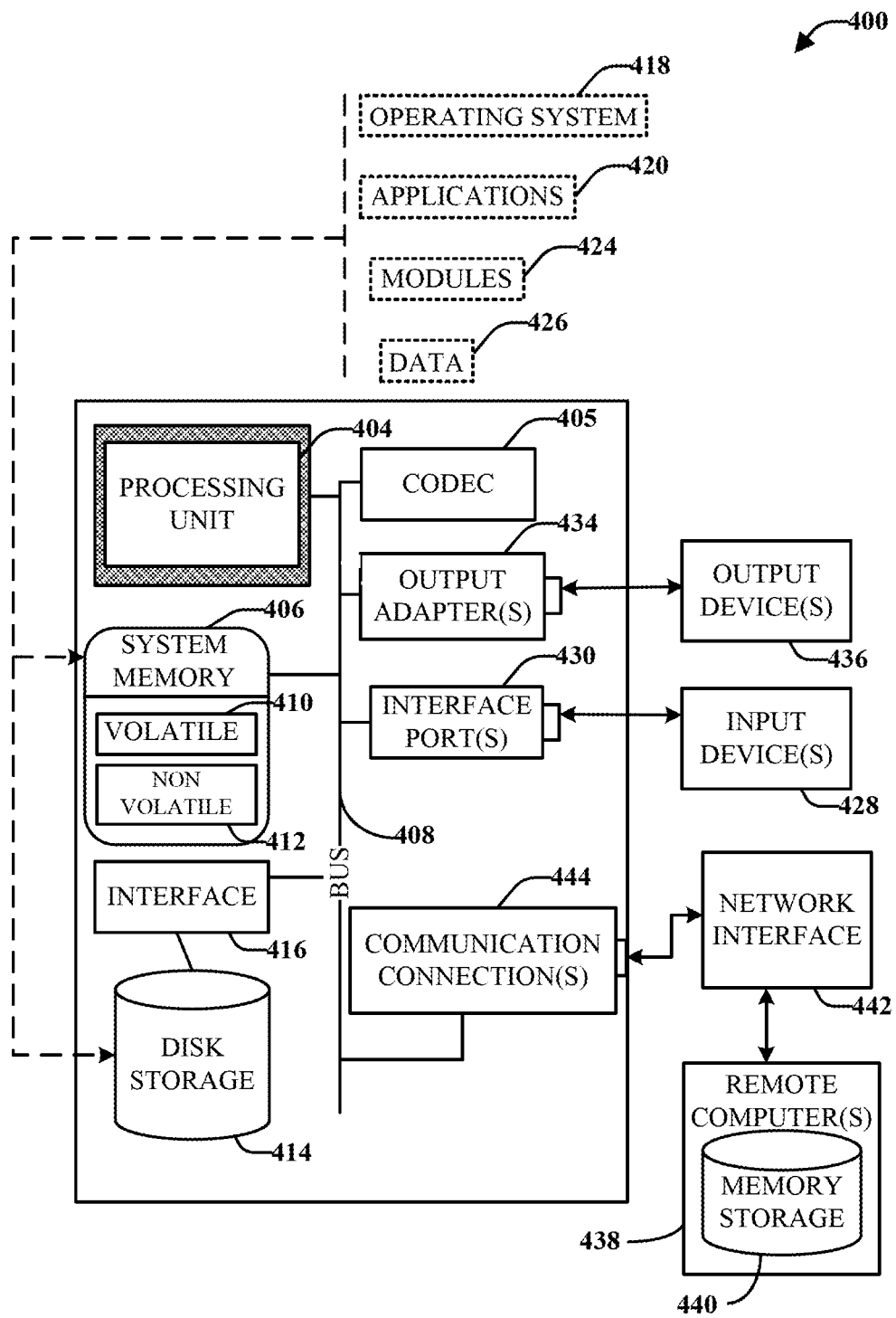
FIG. 4 is a schematic block diagram illustrating a suitable operating environment in accordance with various aspects and embodiments.

While a product or service's core feature attributes are often linked to causal effects, there are often supplemental feature attributes associated with the core features whose supplemental feature impact is difficult to ascertain. For example, when there is promotional price for a product in a store (a core feature attribute), there may be merchandising activities such as the inclusion of an in-store display (a supplemental feature attribute) that sets it apart from competing products, in addition to the promotional price. However, when a correlative supplemental feature attribute is utilized in conjunction with core feature attribute—an attempt to derive the causal relationship through a statistical analysis such as regression the correlative relationship of the supplemental feature may not emerge as a statistically significant causal variable. Therefore, there is a need for a method and process which evaluates the impacts of supplemental feature attribute(s) on desired outcomes as shown in FIG. 4.

At 310, observed data to be analyzed is segmented into groups consisting of: treated group(s) comprised of data derived from the sources containing both common core feature attributes and supplemental feature attributes; and separately untreated group(s) that are comprised of data derived from sources containing common core feature attributes only. A normalized comparison outcome metric that allows the comparison of outcomes across treated and untreated group(s) is calculated for the treated and untreated groups; where the normalized metric maybe designated as ($NM\_Treated_a$) for the treated group(s), and ($NM\_Untreated_a$) for the untreated group(s).

At 320, an econometric model is developed using the core attribute features using the principles and techniques that were discussed in act 240 of embodiment 1, above.

At 330, a Scenario 0 is established with the same core features attributes and values for both the treated and untreated groups separately. The econometric model (320) is applied to each group for the evaluation period and the predicted outcome(s) (332), the econometric model error, the calibration factor(s) (333), and the calibrated outcome(s) are computed using the principles and techniques described in act 251 of embodiment 1, above.

At 340, Scenario 1 is established with the same assumed values for core feature attributes for both the treated and untreated groups separately. The econometric model (320) is applied to each group for the evaluation period and the calibrated outcome(s) are computed using principles and techniques described in act 258 of embodiment 1, above.

At 350, the base line outcomes are converted into normalized comparison outcome metrics for the treated ($NM\_Treated_b$) and untreated groups ($NM\_Untreated_b$).

At 360, the lift in the treated group ($Lift\_t$) and the lift in the untreated ($Lift\_u$) group are computed.

At 370, hypothesis testing is conducted to evaluate if the lifts ($Lift\_t$ and $Lift\_u$) across treated and untreated groups are similar or have statistical validity.

At 380, the lifts metrics and the hypothesis testing results are documented in a repository. The lifts metrics and its derivatives and used for decision making (e.g., return on investment calculation, forecast adjustment, . . . )

An Applied Example of Evaluating the Impact of Supplemental Features on Outcomes.

An example of the application of the process which is described above in 310 through 380, and illustrated in FIG. 3 with regard to evaluating the impact of a supplemental feature (having in-store merchandising activity, which will be referred to as a "Spirits In-Store Display") is demonstrated herein.

Applying act 310, a treated group (stores that had a display merchandising activity) and untreated group (stores that did not have display merchandising activity) but share common price feature are identified and a normalized comparison metric (market share) in the respective groups is computed as shown in Table 4.

Applying act 320, an econometric model is developed such as a basic econometric model: Log(Spirits Quantity)= $c_0 + c_1$ Log(Spirits Price)+e.

Applying act 332, the econometric model is applied and predicted volume is computed.

Applying act 333, the model error (variance in actual versus predicted volume) is identified and calibration factor that compensate for model error are developed.

Applying act 341, the econometric model is applied to the treated and untreated groups separately, utilizing a normalization assumption that the product was not on a price promotion in either group.

Applying act 342, the calibration factors from 333 are applied to the normalized outcomes from 341.

Applying act 350, the normalized comparison metric (market share without a price promotion) is computed for both the treated and untreated groups to identify the impact of price promotion.

Applying act 360, a lift metric for the treated and untreated groups is computed for each group. In this example the absolute lift and relative lift (which provides a normalized metric for comparison) are computed as depicted in Table 4 at lines 361 and 362 for each of the treated and untreated group.

Applying act 370, the variation of the relative lift metrics between the treated and untreated groups are analyzed to see if the lift variance is by chance or has statistical validity using hypothesis testing. For example, t-Test for the significance of the difference between the relative market share lift averages of the two independent samples is conducted to establish statistical validity of the results.

Applying act 380, the lift testing results are stored and used for decision support as needed. For example, assuming the treated group has on average 1.33% higher lift compared to the untreated group, the value of 1.33% is computed in terms of incremental units and associating it with the treatment cost the return on investment from merchandising activity may be calculated.

TABLE 4

Supplemental Feature Impact Analysis.

| | Treated (Stores with Displays) | Untreated (Stores without Displays) |
|---|---|---|
| Scenario 0 | | |
| Prior/Baseline Core Feature Value | $29.95 | $29.95 |
| Market Volume | 38,000 | 25,000 |
| 310-Normalized Metric (Market Share) | 11.84% | 11.04% |
| 331-Baseline Volume | 4500 | 2760 |
| 332-Predicted Volume | 4635 | 2700 |
| 333-Calibration Factor (PE) | 3% | −2% |
| Scenario 1 | | |
| Assumed Core Feature Value (No Price Promotion) | $32.95 | $32.95 |
| 341-Predicted Volume | 4275 | 2520 |
| 342-Calibrated Volume for Assumed Value (100 +/− PE) | 4,147 | 2,575 |
| 350-Normalized Metric (Market Share) | 10.91% | 10.30% |
| 360-Lift Metric | | |
| 361-Absolute Lift (310 less 350) | 0.93% | 0.74% |
| 362-Relative Lift (Percentage change from 361 to 350) | 8.52% | 7.19% |

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

With reference to FIG. 4, a suitable environment 400 for implementing various aspects of the claimed subject matter includes a computer 402. The computer 402 includes a processing unit 404, a system memory 406, a codec 405, and a system bus 408. The system bus 408 couples system components including, but not limited to, the system memory 406 to the processing unit 404. The processing unit 404 can be any of various available processors. Dual microprocessors and other multiprocessor architectures also can be employed as the processing unit 404.

The system bus 408 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 13104), and Small Computer Systems Interface (SCSI).

The system memory 406 includes volatile memory 410 and non-volatile memory 412. The basic input/output system (BIOS), containing the basic routines to transfer information between elements within the computer 402, such as during start-up, is stored in non-volatile memory 412. In addition, according to present innovations, codec 405 may include at least one of an encoder or decoder, wherein the at least one of an encoder or decoder may consist of hardware, a combination of hardware and software, or software. Although, codec 405 is depicted as a separate component, codec 405 may be contained within non-volatile memory 412. By way of illustration, and not limitation, non-volatile memory 412 can include read only memory (ROM), programmable ROM (PROM), electrically programmable ROM (EPROM), electrically erasable programmable ROM (EEPROM), or flash memory. Volatile memory 410 includes random access memory (RAM), which acts as external cache memory. According to present aspects, the volatile memory may store the write operation retry logic (not shown in FIG. 4) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 402 may also include removable/non-removable, volatile/non-volatile computer storage medium. FIG. 4 illustrates, for example, disk storage 414. Disk storage 414 includes, but is not limited to, devices like a magnetic disk drive, solid state disk (SSD) floppy disk drive, tape drive, Jaz drive, Zip drive, LS-70 drive, flash memory card, or memory stick. In addition, disk storage 414 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 414 to the system bus 408, a removable or non-removable interface is typically used, such as interface 416.

It is to be appreciated that FIG. 4 describes software that acts as an intermediary between users and the basic computer resources described in the suitable operating environment 400. Such software includes an operating system 418. Operating system 418, which can be stored on disk storage 414, acts to control and allocate resources of the computer system 402. Applications 420 take advantage of the management of resources by operating system 418 through program modules 424, and program data 426, such as the boot/shutdown transaction table and the like, stored either in system memory 406 or on disk storage 414. It is to be appreciated that the claimed subject matter can be implemented with various operating systems or combinations of operating systems.

A user enters commands or information into the computer 402 through input device(s) 428. Input devices 428 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 404 through the system bus 408 via interface port(s) 430. Interface port(s) 430 include, for example, a serial port, a parallel port, a game port, and a universal serial bus (USB). Output device(s) 436 use some of the same type of ports as input device(s). Thus, for example, a USB port may be used to provide input to computer 402, and to output information from computer 402 to an output device 436. Output adapter 434 is provided to illustrate that there are some output devices 436 like monitors, speakers, and printers, among other output devices 436, which require special adapters. The output adapters 434 include, by way of illustration and not limitation, video and sound cards that provide a means of connection between the output device 436 and the system bus 408. It should be noted that other devices and/or systems of devices provide both input and output capabilities such as remote computer(s) 438.

Computer 402 can operate in a networked environment using logical connections to one or more remote computers, such as remote computer(s) 438. The remote computer(s) 438 can be a personal computer, a server, a router, a network PC, a workstation, a microprocessor based appliance, a peer device, a smart phone, a tablet, or other network node, and typically includes many of the elements described relative to computer 402. For purposes of brevity, only a memory storage device 440 is illustrated with remote computer(s) 438. Remote computer(s) 438 is logically connected to computer 402 through a network interface 442 and then connected via communication connection(s) 444. Network interface 442 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 444 refers to the hardware/software employed to connect the network interface 442 to the bus 408. While communication connection 444 is shown for illustrative clarity inside computer 402, it can also be external to computer 402. The hardware/software necessary for connection to the network interface 442 includes, for exemplary purposes only, internal and external technologies such as, modems including regular telephone grade modems, cable modems and DSL modems, ISDN adapters, and wired and wireless Ethernet cards, hubs, and routers.

Figure 5:
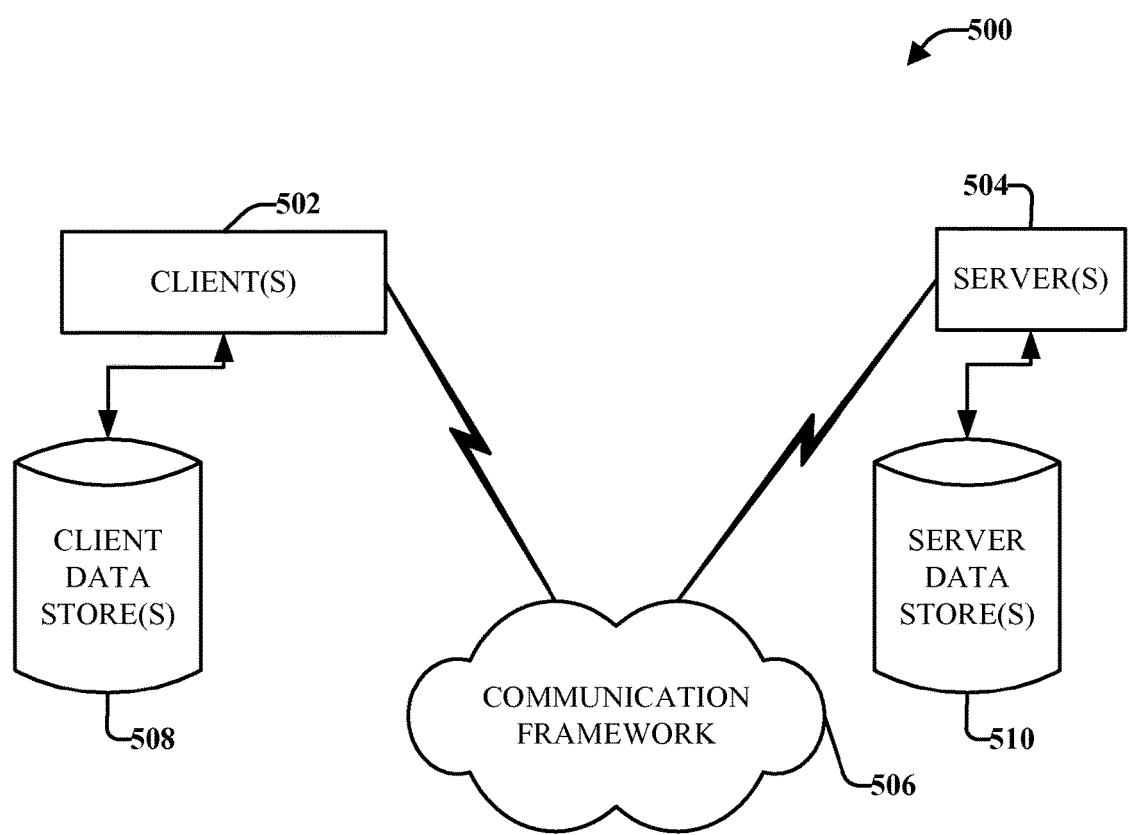
FIG. 5 is a schematic block diagram of a sample-computing environment in accordance with various aspects and embodiments.

Referring now to FIG. 5, there is illustrated a schematic block diagram of a computing environment 500 in accordance with this disclosure. The system 500 includes one or more client(s) 502 (e.g., laptops, smart phones, PDAs, media players, computers, portable electronic devices, tablets, and the like). The client(s) 502 can be hardware and/or software (e.g., threads, processes, computing devices). The system 500 also includes one or more server(s) 504. The server(s) 504 can also be hardware or hardware in combination with software (e.g., threads, processes, computing devices). The servers 504 can house threads to perform transformations by employing aspects of this disclosure, for example. One possible communication between a client 502 and a server 504 can be in the form of a data packet transmitted between two or more computer processes wherein the data packet may include video data. The data packet can include a metadata, e.g., associated contextual information, for example. The system 500 includes a communication framework 506 (e.g., a global communication network such as the Internet, or mobile network(s)) that can be employed to facilitate communications between the client(s) 502 and the server(s) 504.

Communications can be facilitated via a wired (including optical fiber) and/or wireless technology. The client(s) 502 include or are operatively connected to one or more client data store(s) 508 that can be employed to store information local to the client(s) 502 (e.g., associated contextual information). Similarly, the server(s) 504 are operatively include or are operatively connected to one or more server data store(s) 510 that can be employed to store information local to the servers 504.

In one embodiment, a client 502 can transfer an encoded file, in accordance with the disclosed subject matter, to server 504. Server 504 can store the file, decode the file, or transmit the file to another client 502. It is to be appreciated, that a client 502 can also transfer uncompressed file to a server 504 and server 504 can compress the file in accordance with the disclosed subject matter. Likewise, server 504 can encode video information and transmit the information via communication framework 506 to one or more clients 502.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from a computer-readable device or storage media.

What is claimed is:

1. A method for automatically generating a feature strategy scenario, comprising:
   storing data for a product or service object in a data store that is in communication with a machine learning system comprising a processor configured to perform one or more operations associated with a machine learning process;

transmitting the data to the machine learning system via a network;

using the machine learning system to determine feature information for the product or service object via feature based modeling of the data, the machine learning system comprising the processor, configured to perform the one or more operations associated with the machine learning process, to execute the following computer executable instructions stored in a memory to perform the following acts:

analyzing the data to identify features of interest for the product or service object;

determining feature attributes within known outcomes;

determining variation of the feature attributes over a predictive period of time, and generating a display of the variation of feature attributes;

determining a first model for a first feature strategy scenario based on feature attribute combinations and variations from historical data associated with another period of time that is different than the predictive period of time;

determining a second model for a second feature strategy scenario based on the variation of the feature attributes over the predictive period of time, wherein the first feature strategy scenario and the second feature strategy scenario include assessment and qualification of efficacy of strategic outcomes;

determining a machine learning strategy derived from supervised machine learning or un-supervised learning machine learning based on derived feature related variables associated with the first feature strategy scenario and the second feature strategy scenario;

reconfiguring the machine learning process based on the machine learning strategy to generate a third model forecasting and optimizing with or without desired external causal variables;

applying a first weight to the first model associated with the first feature strategy scenario, a second weight to the second model associated with the second feature strategy scenario, and a third weight to the third model associated with the machine learning process;

generating a composite model by combining the first model associated with the first weight and first feature strategy scenario, the second model associated with the second weight and the second feature strategy scenario, and the third model associated with the third weight and the machine learning process;

validating the composite model based on the first feature strategy scenario to generate a first predicted outcome associated with the product or service object;

validating the composite model based on the second feature strategy scenario to generate a second predicted outcome associated with the product or service object;

calibrating, using an error calibration factor associated with percentage error, the first predicted outcome generated from the composite model and the second predicted outcome generated from the composite model;

determining, for the product or service object, a third feature strategy scenario based on a comparison between the first predicted outcome, generated as a function of the first feature strategy scenario, the error calibration factor and the composite model, and the second predicted outcome, generated as a function of the second feature strategy scenario, the error calibration factor and the composite model;

transmitting information associated with the third feature strategy scenario for the product or service object to a client device that is in communication with the machine learning system via the network; and presenting the information associated with the third feature strategy scenario for the product or service object on the client device that is in communication with the machine learning system via the network.

2. The method of claim 1, wherein the determining the feature attributes comprises determining functionality, price, sales, service or marketing activities associated with the product or service object.

3. The method of claim 1, wherein the analyzing comprises identifying the features of interest based on business objective data, business strategy data, observational data, primary research data, product informational material, and/or service informational material included in the data store.

4. The method of claim 1, further comprising segmenting the data into a plurality of groups that comprise the feature attributes and supplemental feature attributes associated with the product or service object for feature assessment, feature strategy and outcome refinement.

5. The method of claim 1, wherein the determining the second feature strategy scenario comprises determining an observational strategy regarding feature attribute combinations that include at least one of popular choice attributes or strategies with heightened efficacy.

6. The method of claim 1, wherein the determining the second feature strategy scenario comprises determining a business rule strategy.

7. The method of claim 1, wherein the determining the second feature strategy scenario comprises determining an experimental design strategy derived from combining feature metrics through use of design of experiments.

8. The method of claim 1, wherein the determining the second feature strategy scenario comprises determining a combination strategy comprised of combinations of one or more potential strategies and objectives.

9. The method of claim 1, further comprising, in response to a determination that modeling data is derived from an in-sample or estimation period and that an outcome variable (Y) and related values for the feature and/or causal variables ($X_1 \ldots X_n$) are known, computing a forecast error (Yt−Ŷt) using forecast error measures including:

Percentage Error (PE): $((Y_t - \hat{Y}_t)/Y_t)*100$

Mean Absolute Percentage Error (MAPE):

$$\sum_{t=1}^{n} \frac{100}{n} |Y_t - \hat{Y}_t| / Y_t$$

Mean Squared Error (MSE):

$$\sum_{t=1}^{n} (Y_t - \hat{Y}_t)^2 / n$$

Root Mean Squared Error (RMSE): $\sqrt{MSE}$, wherein accuracy, sensitivity, specificity, and derived measures are determined from an N×N confusion matrix when the dependent variable is classified or classification constraints are applied.

10. A system, comprising:

a data store for storing data for a product or service object; and a machine learning system to determine feature information for the product or service object via feature based modeling of the data, the machine learning system comprising:

a memory that stores computer executable components;

a processor, configured to perform one or more operations associated with a machine learning process, that executes at least the following computer executable components stored in the memory:

an identification component that identifies features of interest and assessment for the product or service object based on the data included in a data store that is in communication with the system via a network;

an analysis component that determines or measures existence of feature attributes within known outcomes;

a variance component that determines variation of the feature attributes over a time horizon, and generates a display of the variation of feature attributes;

a strategy component that generates and displays a first potential strategy based on data associated with a time period prior to the time horizon, and a second potential strategy based on the variation of the feature attributes over the time horizon, wherein the first potential strategy and the second potential strategy include assessment and qualification of efficacy of strategic outcomes, wherein the first potential strategy is associated with a first model and the second potential strategy is associated with a second model, and wherein the strategy component determines a machine learning strategy derived from supervised machine learning or un-supervised learning machine learning based on derived feature related variables for the product or service object;

a modeling component that reconfigures the machine learning process based on the machine learning strategy to generate a third model with or without desired external causal variables, wherein the modeling component applies a first weight to the first model associated with the first potential strategy, a second weight to the second model associated with the second potential strategy, and a third weight to the third model associated with the machine learning process, and wherein the modeling component combines the first model associated with the first weight and the first potential strategy, the second model associated with the second weight and the second potential strategy, and the third model associated with the third weight and the machine learning process to generate a composite model;

a validation component that validates the composite model based on the first potential strategy to generate a first predicted outcome associated with the product or service object, validates the composite model based on the second potential strategy to generate a second predicted outcome associated with the product or service object, and calibrates, using a calibration value associated with percentage error, the first predicted outcome generated from the composite model and the second predicted outcome generated from the composite model; and an optimization component that determines, for the product or service object, information for a strategy scenario that is presented on a client device, in communication with the system via the network, based on a comparison between the first predicted outcome, generated as a function of the first potential strategy, the calibration value and the composite model, and the second predicted outcome, generated as a function of the second potential strategy, the calibration value and the composite model.

11. The system of claim 10, wherein the identification component identifies features of interest that are identified from observational data, primary research, product informational material, or service informational material stored in the data store.

12. The system of claim 10, wherein the analysis component measures metrics of the feature attributes in relation to outcomes as discrete or continuous variables for representative periods.

13. The system of claim 10, wherein the strategy component generates observational strategies regarding feature attribute combinations that include at least one of popular choice attributes or strategies with heightened efficacy.

14. The system of claim 10, wherein the strategy component generates business rule strategies.

15. The system of claim 10, wherein the strategy component generates experimental design strategies derived from combining feature metrics through use of design of experiments.

16. The system of claim 10, wherein the strategy component generates combination strategies comprised of combinations of one or more potential strategies.

17. The system of claim 10, wherein, in response to a determination that modeling data is derived from an in-sample or estimation period and that an outcome variable (Y) and related values for the feature and/or causal variables ($X_1 \ldots X_n$) are known, the validation component computes a forecast error (Yt–Ŷt) based on forecast error measures including:

Percentage Error (PE): $((Y_t - \hat{Y}_t))/Y_t)*100$

Mean Absolute Percentage Error (MAPE):

$$\sum_{t=1}^{n} \frac{100}{n} |Y_t - \hat{Y}_t| / Y_t$$

Mean Squared Error (MSE):

$$\sum_{t=1}^{n} (Y_t - \hat{Y}_t)^2 / n$$

Root Mean Squared Error (RMSE): $\sqrt{MSE}$, wherein the validation component determines accuracy, sensitivity, specificity, and derived measures from an N×N confusion matrix when the dependent variable is classified or classification constraints are applied.

18. A non-transitory computer-readable storage medium comprising computer-readable instructions that, when executed by a processor configured to perform a machine learning process to determine feature information for a product or service object via feature based modeling of data, facilitate performance of operations, comprising:

receiving, from a data store that is in communication with the processor via a network, the data for the product or service object;

analyzing the data to identify features of interest and assessment for the product or service object;

determining or measuring existence of feature attributes within known outcomes;

determining variation of the feature attributes over an interval of time, and generating a display of the variation of feature attributes;

generating a first model for a first feature strategy based on information associated with another interval of time that is different than the interval of time;

generating a second model for a second feature strategy based on the variation of the feature attributes over the interval of time, wherein the first feature strategy and the second feature strategy include assessment and qualification of efficacy of strategic outcomes;

determining a machine learning strategy derived from supervised machine learning or un-supervised learning machine learning based on derived feature related variables for the product or service object;

reconfiguring the machine learning process based on the machine learning strategy to generate a third model associated with the machine learning process;

applying a first weight to the first model associated with the first feature strategy, a second weight to the second model associated with the second feature strategy, and a third weight to the third model associated with the machine learning process;

generating a composite model by combining the first model associated with the first weight and first feature strategy, the second model associated with the second weight and the second feature strategy, and the third model associated with the third weight and the machine learning process;

generating a first predicted outcome associated with the product or service object by validating the composite model based on the first feature strategy;

generating a second predicted outcome associated with the product or service object by validating the composite model based on the second feature strategy;

calibrating, using an error calibration factor associated with percentage error, the first predicted outcome generated from the composite model and the second predicted outcome generated from the composite model; and generating, for the product or service object, a third feature strategy that is provided to a client device via the network based on a comparison between the first predicted outcome, generated as a function of the first feature strategy, the error calibration factor and the composite model, and the second predicted outcome, generated as a function of the second feature strategy, the error calibration factor and the composite model.

* * * * *